June 16, 1959 P. FREEN 2,891,222

TELEVISION DISTRIBUTION SYSTEM

Filed Dec. 7, 1956 2 Sheets-Sheet 1

INVENTOR.
PHILIP FREEN
BY
Anster & Levy
ATTORNEYS

June 16, 1959 P. FREEN 2,891,222

TELEVISION DISTRIBUTION SYSTEM

Filed Dec. 7, 1956 2 Sheets-Sheet 2

INVENTOR.
PHILIP FREEN
BY
Anster & Levy
ATTORNEYS

United States Patent Office 2,891,222

Patented June 16, 1959

2,891,222

TELEVISION DISTRIBUTION SYSTEM

Philip Freen, Lorne Park, Ontario, Canada

Application December 7, 1956, Serial No. 627,009

4 Claims. (Cl. 333—8)

The present invention relates generally to the distribution of television signals, and in particular to an improved means for tapping off or connecting a branch of coaxial cable to a main coaxial cable.

In a typical community television system, a main or master antenna is strategically placed to receive television signals which are then fed to a main coaxial cable which runs to locations close to the various subscribers. Usually, the main coaxial cable is placed on public utility poles or underground in a manner similar to telephone lines. The course for the cable is established so that all subscribers to the community distribution system will be within a few hundred feet of the cable. In order to provide television signals for a subscriber's set, the main coaxial cable is tapped through the use of an appropriate high frequency coupling and branch coaxial cable. Under present standards, the system must be capable of handling signals from commercial television transmitting stations which are assigned to the VHF band which consists of twelve channels each six megacycles wide which occupy the frequency bands of 54 megacycles to 88 megacycles and 174 megacycles to 216 megacycles.

As is well known in the art, it is possible to make the tap or connection from the main coaxial cable to the branch coaxial cable by an insertion into the main coaxial cable and connection of the main coaxial cable by high frequency connectors containing a low pass filter network to the branch coaxial cable. By these generally known expedients, it is possible to extract energy from the main coaxial line without appreciably altering its characteristic impedance or otherwise affecting its signal transmission characteristics. In that the low pass filter network may be precisely designed so as to not degrade the signal carried by the main coaxial cable, this is an ideal method of extracting the high frequency television signals at the various subscriber locations. However, the necessity of making a physical insertion into the main coaxial cable imposes the requirements that the coaxial cable be cut, cable connectors sweated or otherwise secured onto the ends of the cable, and the insertion then made. Apart from the fact that this is time consuming, it is quite difficult to achieve, particularly with unskilled labor, when working under adverse weather conditions, or when the main coaxial cable is run overhead on public utility poles.

Broadly, it is an object of the present invention to provide an improved system for extracting signals from a signal transmission line obviating one or more of the aforesaid difficulties. Specifically, it is within the contemplation of the present invention to provide an improved tap-off for extracting signals from a main distribution line without the need of physical insertions in said line.

In an attempt to overcome these difficulties, industry has made resort to a solderless type of tap-off which includes a clamp body adapted to be engaged around the main coaxial cable. The clamp body carries a long electrically conductive pin and short electrically conductive pins. Upon attachment of the clamp body, the long pin pierces the outer conductor, the insulation and makes contact with the center conductor of the cable; while the short pins make contact with the outer conductor of the cable. The long pin connected to the center conductor is then connected to the distribution line via a condenser to extract signals for the subscriber location.

These known solderless tap-offs overcome some of the mechanical difficulties but at the same time create a serious electrical problem. This in part may be attributed to the fact that the pin which makes contact with the center conductor of the coaxial cable has unavoidable stray capacitance to the outer conductor. This coupled with the additional capacitative load on the center conductor as a result of the subscriber's connection places a heavy reactive load on the main coaxial cable. The increased capacitance between the inner and outer conductors per unit length of the main distribution cable alters the characteristic impedance of the cable. The stray capacitance thus introduced can be reduced to a minimum by reducing the surface area of the pin connection to the center conductor. Reduction of the surface area of the pin requires that the pin be of small diameter, which is basically antagonistic to the requirement that the pin be of sufficient strength to allow the same to readily penetrate the cable to make contact with its center conductor. Practical experience indicates that a pin of sufficient cross section to be structurally stable and useful, materially alters the characteristic impedance of the line. In an attempt to overcome the difficulty of uncompensated capacitative loading, it has been suggested that a minimum cross section be resorted to for the pin connection in a solderless tap-off. This requires the predrilling a lead hole for the pin when the same is to be connected to the center conductor of the coaxial cable and at best is only partially effective.

Still further, the signal degradation caused by conventional solderless tap-offs in installations requiring comparatively long runs of the main coaxial cable is frequently prohibitive and necessitates that the system be modified to include two main coaxial cables which are run side by side. One of the main cables is used to provide an unadulterated signal between successive amplifiers in the distribution system, while the other main cable is used for subscriber connections at locations between successive in-line amplifiers in the system. It will of course be appreciated that this represents an appreciable increase in the initial cost of the system and imposes greater expenses for upkeep and maintenance of the system.

It is still another object of the present invention to provide an improved tap-off of the solderless type useful in signal distribution systems. Advantageously, a practical solderless tap-off is provided which may be connected to a main distribution line without appreciably altering the characteristic impedance of the line or bringing about prohibitive standing wave ratios.

In accordance with an illustrative embodiment demonstrating features of the present invention, a solderless tap-off is provided for connection between a branch coaxial cable and a main coaxial cable which includes impedance transformation means connected between the inner and outer conductors of the branch coaxial cable and so constructed and arranged as to provide a shunt resistive load across the main coaxial cable of a magnitude greater than ten times the characteristic impedance of the main coaxial cable. Loading of the main coaxial cable by a purely resistive load of not less than ten times the characteristic impedance of the main coaxial line minimizes the standing wave ratio which is the cause of signal degradation.

As a further feature of the invention, the present tap-off is both electrically compensated for capacitative loading and mechanically constructed to be self tapping into the coaxial line. The mechanical strength of the tap-off pin is such as to allow for repeated insertions without the risk of bending or otherwise deforming the pin.

The above brief description, as well as further objects, features and advantages of the present invention will be more fully appreciated by reference to the following detailed description of presently preferred embodiments, when taken in conjunction with the accompanying drawing, wherein.

Figure 1:
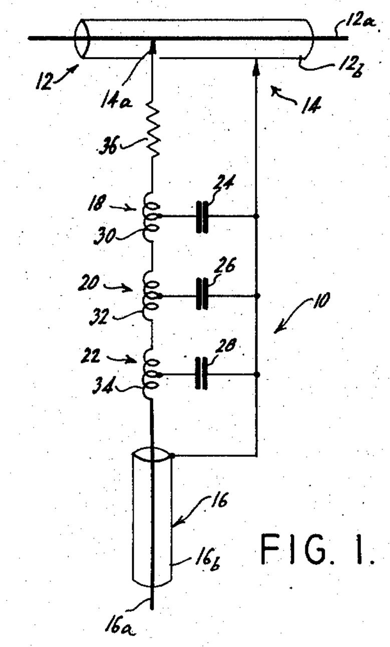
Fig. 1 is a schematic diagram of the electric network for an improved solderless tap-off demonstrating features of the present invention.

Referring now specifically to the drawing, there is shown schematically in Fig. 1 a solderless tap-off and associated impedance transformation network 10 in accordance with the present invention which is capable of converting the load placed upon the main coaxial cable 12 via the subscriber's tap-off 14 by the branch coaxial cable 16 into a purely resistive load of not less than ten times the characteristic impedance of the main coaxial cable 12. Conventional impedance transformation network are not feasible in that the distribution system for television signals must cover the wide range from 54 to 88 megacycles and from 174 to 216 megacycles. The solderless tap-off 14 includes the long contacting pin, schematically indicated as the contact 14*a*, which extends through the outer conductor or sheath 12*b* of the main coaxial cable 12 and is electrically insulated therefrom. A further contact pin or pins 14*b* make the required electrical connection to the outer conductor 12*b* of the main coaxial cable 12. The pins 14*a*, 14*b* of the solderless tap-off 14 are connected via the improved impedance transformation network 10 respectively to the inner conductor 16*a* and the outer conductor 16*b* of the branch or subscriber's cable 16.

The network 10 includes three identical delay line sections 18, 20, 22 which are recognized as a familiar T-section delay line. Each of the delay line sections includes a condenser 24, 26, 28 extending across the contracts or lines 14*a*, 14*b* and inductances 30, 32, 34 connected in one side of the line and each center tapped to its associated condenser. The delay line sections 18, 20, 22 are so constructed as to transform the impedance of the subscriber's line 16 to the prescribed, purely resistive load on the main line 12. As is well understood, the characteristic impedance of each delay line section may be readily computed by taking the square root of the short circuit impedance times the open circuit impedance. The three-section delay line 18, 20, 22 is so arranged that at or close to the mid-band frequency of the upper frequency band (174–216 mc.), the delay line sections serve as a three-quarter wave line to achieve the required impedance transformation function; while at or close to the mid-band frequency of the lower frequency band (54–88 mc.) the delay line sections serve as a one-quarter wave line to achieve the required impedance transformation function. A resistance 36 connected in series with the delay line sections 18, 20, 22 serves to broaden the response to adequately cover the respective television frequency bands.

The function of the circuit of Fig. 1 will be best appreciated by considering a typical illustrative design for a main coaxial cable having a characteristic impedance of 75 ohms. If it be assumed that the solderless tap-off is designed to place across the main coaxial cable 12 a 1200 ohm resistive load, the criterion that the shunt resistance be greater than 10 times the characteristic impedance of the main coaxial line is met. In order for the delay line to achieve this impedance transformation function over the upper frequency band, the delay line is so constructed that its characteristic impedance is equal to 300 ohms. This value is arrived at by taking the square root of the open circuit impedance (1200 ohms) times the short circuit impedance (75 ohms). Thus, the delay line will be effective to transform a load of 75 ohms at its output end (subscriber's line) to 1200 ohms at its input end (main line) and with a delay equivalent to 270 electrical degrees at the frequency of operation. The frequency of operation is selected at or close to the mid-band of the upper frequency range which is 194 megacycles. This mid-band frequency is ascertained by taking the square root of the frequencies at the lower and upper limits of the band. The delay line is designed to operate at the frequency of 200 megacycles with its delay equivalent of 270 electrical degrees and the required characteristic impedance of 300 ohms so that the mid band frequency of the lower band may be at approximately one-third of the upper mid-band frequency. It will be appreciated that the delay line is the equivalent of a quarter wave transmission line transformer which could also achieve the requisite impedance transformation function from the branch coaxial cable 16 to the main coaxial cable 12. Further the delay line is equivalent to a three quarter wave transformer which provides an electrical delay of 270° and the requisite impedance at the frequency of operation.

To achieve the impedance transformation at the center of the low frequency band which has its electrical center at approximately 69 megacycles, the two additional delay line sections 20, 22 are added. The three sections together are the equivalent of a three quarter wave transmission line transformer at the selected frequency (200 mc.) in the upper range of the VHF band (174–216 mc.) and are the equivalent of a quarter wave transmission line transformer at the submultiple frequency (67 mc.) in the lower range of the VHF band (54–88 mc.). The addition of the resistance 36 of the order of 150 ohms broadens the response of the respective delay line transformers so that the impedance transformation will adequately cover the television frequency bands of 54–88 megacycles and 174–216 megacycles.

The use of the T-section delay line in the drawings is purely illustrative. It will be appreciated by those skilled in the art that pi section lines and still other types of delay networks may be utilized to practice the present invention. However, the illustrative simple T-section delay line is exceptionally useful in that it is easy to fabricate, utilizes a minimum number of components and may be comparatively compact so that the same may be incorporated into a small size encased unit with the mechanical parts of the solderless tap-off.

Units constructed in accordance with the present invention and embodying the circuit of Fig. 1 have the following performance as compared to conventional solderless tap-offs employing a condenser:

| | Fig. 1 | Conventional |
|---|---|---|
| Loss from main coaxial cable to branch subscriber cable ____ db__ | 12 | 12 |
| Standing waves introduced by tapping onto main coaxial cable ____ db__ | 1.05 | 1.15 |

By a consideration of the above table, it will be appreciated that for equal tap-off loss, the delay line impedance transformation network of the present invention gives an improvement of over three to one in the standing wave ratio introduced into the main coaxial line 12 by insertion of the solderless tap-off 14.

Figure 2:
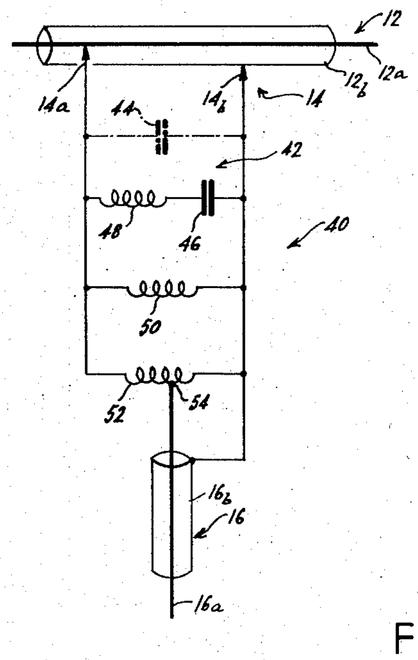
Fig. 2 is a schematic diagram of a modified electrical network for a solderless tap-off demonstrating still further features of the present invention.

Reference will now be made to Fig. 2 which shows a modified and presently preferred impedance transformation network 40 for connecting the main coaxial cable 12 via the solderless tap-off 14 to the subscriber's coaxial line 16. This preferred circuit also meets the requirement of transforming the impedance of the subscriber's tap-off to a purely resistive load in excess of ten times the characteristic impedance of the main line. The impedance transformation network 40 includes a one to one resonant transformer 42 which includes a condenser 44 shunted by series-connected condenser and inductance 46, 48. The parameters of the condenser 46 and the inductance 48 are selected to achieve resonance at the mid-band frequency of the upper range of the VHF band, to wit, at 194 megacycles. The transformer 42 is shunted by an inductance 50 and an impedance transformation device 52 which is in the form of a toroidal transformer having a ferrite core and a prescribed turn ratio. The shunting capacitance, represented by the condenser 44 which is illustrated by the broken lines, consists of the unavoidable stray capacity placed across the inner and outer conductors **12*a*, 12*b* of the main line 12 as a result of the capacitance that the connecting pin 14*a* has to the outer conductor, as well as any unavoidable stray capacitance presents across the winding of the transformer 52**.

It should be appreciated that the stray capacitance of the transformer 52 is very small and is the factor which makes possible the circuit design of Fig. 2, as will appear hereinafter. The reason for the small stray capacitance across transformer 52 is that the very high permeability of the ferrite core enables a small number of turns to be employed in the toroidal transformer to achieve the impedance transformation with a consequent greater reduction in the capacitance between turns.

The effective circuit of the impedance transformation network 40 over the upper frequency band (174–216 mc.), specifically at the mid-band frequency of 194 megacycles, will now be considered:

At this mid-band frequency, the value of the inductance 50 is selected to be exceptionally high and for all intents and purposes, the inductance 50 has no appreciable effect in the circuit and may be disregarded. The values of the condenser 46 and the inductance 48 of the one to one resonant transformer 42 will of course depend upon the stray capacitance represented by the condenser 44. The values of the components 46, 48 will be selected in accordance with this total stray capacitance as is well understood. Normally, condenser 46 is equal in value to condenser 44 (stray capacity) and inductance 48 is selected to resonate with these capacitances in series at 194 mc. In lieu of employing inductance 48 in series with the condenser 46, the inductance may be placed in series with the line. At the resonant frequency of the circuit 42, the voltage appearing across the taps **14*a*, 14*b* is equal to the voltage which appears across the condenser 46 and is applied to the transformer 52 which is tapped at the terminal 54 to the center conductor 16*a* of the subscriber's line 16. The transformer 52 is selected to have a turn ratio of four to one. The impedance transformation of the transformer 52 is related to the turn ratio as a square root function. Accordingly, the impedance transformation from the branch coaxial line 16 to the main line 12 will be sixteen to one. Thus, the branch subscriber's coaxial cable which has an impedance of approximately 65 ohms will be transformed to 1200 ohms and applied across the condenser 46 and across the connections 14*a*, 14*b* of the tap-off 14. Since any capacitance introduced into the network, either as a result of the tap-off 14 or as any small residual capacitance of the transformer 52, is accounted for in the resonant circuit 42, the load across the connections of the tap-off 14 is purely resistive and of the magnitude determined by the impedance transformation. It will be appreciated that the resonant circuit may be designed with a sufficiently broad band to look practically resistive over the entire upper frequency range of 174 to 216 megacycles. This is possible because of the small stray capacitance of the ferrite core transformer 52**. If the stray capacitance were large, the band width of the circuit would necessarily be small and the circuit would work over only a narrow band of frequencies, thus introducing difficulties inherent in the design of conventional band pass networks for use at comparable frequencies.

Effective circuit of Fig. 2 at the mid-band frequency of the lower range of 54 to 88 megacycles will now be considered:

At the mid-band frequency of approximately 69 megacycles, the inductance 50 in parallel with the transformer 52 combine to provide a new smaller total inductance which will be the sum of the acceptances of inductances 50, 52. This new smaller inductance in parallel with the stray capacitance 44 and the components 46, 48 resonates at 69 megacycles as a parallel resonant circuit and presents across the main coaxial line 12 a very high pure resistance at such times when the subscriber's branch line is not connected. When the subscriber's branch line is connected, its characteristic impedance is transformed by the ferrite core transformer 52 to the required resistive load. If the inductance 48 were placed in series with the ferrite core transformer 52, a further impedance transformation would occur. Accordingly, the illustrative circuit of Fig. 2 with the inductance 48 shunting the line is preferred.

From the foregoing detailed description of several presently preferred illustrative impedance transformation devices, as detailed in conjunction with Figs. 1 and 2, further variations will occur to those skilled in the art for converting the impedance of the subscriber's line to a purely resistive load on the main line of a magnitude sufficient to minimize or substantially avoid altering the characteristic impedance of the main line and bringing about appreciable standing waves.

Figure 3:
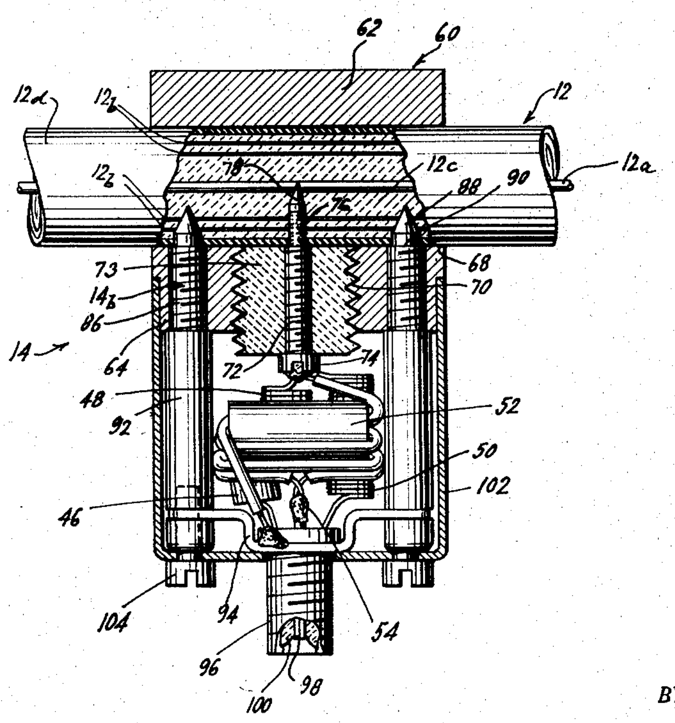
Fig. 3 is an elevational view, with parts broken away in section for clarity, showing a tap-off embodying the circuit of Fig. 3 and connected to a coaxial cable.

In Fig. 3, there is shown an improved solderless tap-off 14 embodying mechanical features of the present invention and incorporating the preferred impedance transformation circuit of Fig. 2. The cable 12 is usually of a conventional type and includes the center conductor **12*a* and the outer sheath or sheaths 12*b*. The conductors are separated by insulation 12*c* and enclosed in an insulating jacket 12*d*. The tap-off 14 includes a bipartite body 60 having opposed half sections 62, 64 each formed with a semi-cylindrical channel or seat 66, 68. The construction of the clamp body 60 may be best appreciated by reference to the exploded showing of Fig. 6. The lower half section 64 of the body is somewhat enlarged and formed with a threaded bore 70 which receives an insulating insert 73 carrying the connecting pin 14*a* for making the center tap connection to the inner conductor 12*a* of the main cable 12**.

Figure 5:
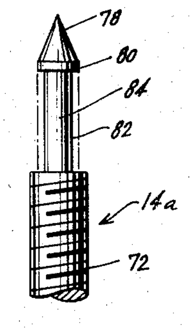
Fig. 5 is a fragmentary elevational view showing the pin of Fig. 4 in partially completed condition.
Figure 4:
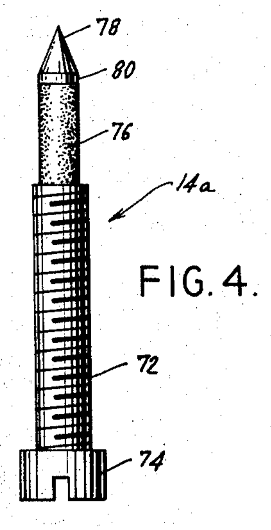
Fig. 4 is an elevational view, on an enlarged scale, of an improved pin construction in accordance with further features of the present invention.

The center pin or connector **14*a* is of improved construction and accordingly has been illustrated in detail in Figs. 4 and 5. The connecting pin 14*a* is fabricated of stainless steel rod and includes a threaded shank 72, a slotted head 74 arranged rearwardly of the shank 72, an insulating extension 76 projecting forwardly of the shank 72, and an electrically conductive conical or pointed contact element or head 78 which is separated from the insulated extension 76 by a shoulder 80. As seen in Fig. 5, an undercut 82 is provided between the shoulder 80 and the adjacent end of the threaded shank 72** which undercut is seen in Fig. 4 to be filled with an insulating enamel (i.e. Formel) which is baked to hardness to provide the insulating sheath about the supporting core 84 of the connecting pin 14a. The conical point or head 78 makes its own lead hole into the coaxial cable 12 as the clamp body 60 is mounted on the cable. The shoulder 80 protects the enamel sheath or coating 76 from being stripped off during the forward thrust of the contact pin 14a as the same is brought to its inserted position as illustrated in Fig. 3. The length of the insulating sheath 76 is selected to effectively isolate the conical head 78 which makes contact with the center conductor 12a of the cable 12 from the outer conductor or shield 12b. Although in the drawing the insulating sheath 76 appears to be of the same diameter as the shoulder 80, the sheath 76 is slightly undersized in relation to the shoulder 80 so that the shoulder protects the insulating sheath during insertion of the contact pin 14a into the coaxial cable 12. In that the contact 14a is essentially fabricated of stainless steel, which is exceptionally strong mechanically although of small cross section, the pin can be forced into the cable without the necessity of predrilling a hole. The insulating sheath is of a thickness of approximately two thousandth of an inch and is effectively protected against injury or being scraped off during the insertion of the pin by the action of the pointed head 78 and the shoulder 80. These parts tend to force a somewhat larger hole in the insulating material of the cable than the effective diameter of the insulated section 76 of the pin 14a. Thus, scraping of the sheath by sharp edges of the shields 12b do not break through the sheath and bring about internal short circuit. Pins constructed according to the present invention function faultlessly after as many as twenty-five insertions into a cable. Thus, they may be used and reused. This is particularly advantageous, especially when compared to conventional solderless taps in which aluminum pins are employed having anodized outer surfaces providing the insulating coating. Such aluminum pins are exceptionally weak and readily bend unless a lead hole is predrilled in the coaxial cable before engagement of the clamp. Further, the pointed head 78 is capable of making a stable and reliable contact by penetrating into the center conductor. This compares favorably to the aluminum pin, the pointed end of which frequently makes only a superficial contact to the conductor.

Returning now to the showing of Fig. 3, the lower half section of the body 60 is seen to carry a pair of short contact pins 14b, each of which is adapted to penetrate into contact with the outer conductive shields 12b and any adjacent layers of braid or the like. Each of the pins 14b includes a threaded shank 86 which is tapped into an appropriate hole in the lower body section 64 and has a projecting conical head 88 which is joined to the threaded shank 86 at an intermediate shoulder 90. Further, each of the pins 14b includes a depending post 92, which posts are straddled by a supporting bracket 94 which carries an externally threaded socket 96 serving as an output connector to the branch subscriber's cable 16. Within the socket 96 is a contact 98 separated from the socket by a body of insulation 100. By the use of an appropriate connector, which is engaged over the threaded socket 96, the subscriber's cable 16 is connected with its center conductor 16a against the contact 98 and its outer conductor or sheath in contact with the socket 96.

The lower half section 64 of the clamp body 60 carries a depending cup-shaped housing 102 which cooperates therewith to provide an enclosure which is adapted to receive the several components of the impedance transformation means 40. The cup-shaped housing 102 is fixed in place by screws 104 which are tapped into threaded bores provided axially of the posts 92. The housing 102 receives the several components of the illustrative circuit of Fig. 2 which components include the condenser 46 and inductance 48 making up the one to one resonant transformer 42, the inductance 50, and the ferrite-core transformer 52. The output tap 54 of the ferrite core transformer 52 is connected to the contact 98, previously described. It should be emphasized that the showing of Figs. 3 to 7, inclusive, is on an enlarged scale and the actual size of a typical unit is of the order of several inches. The entire electrical circuit is readily housed within the cup-shaped enclosure 102 and may be sealed against the elements.

Figures 6, 7:
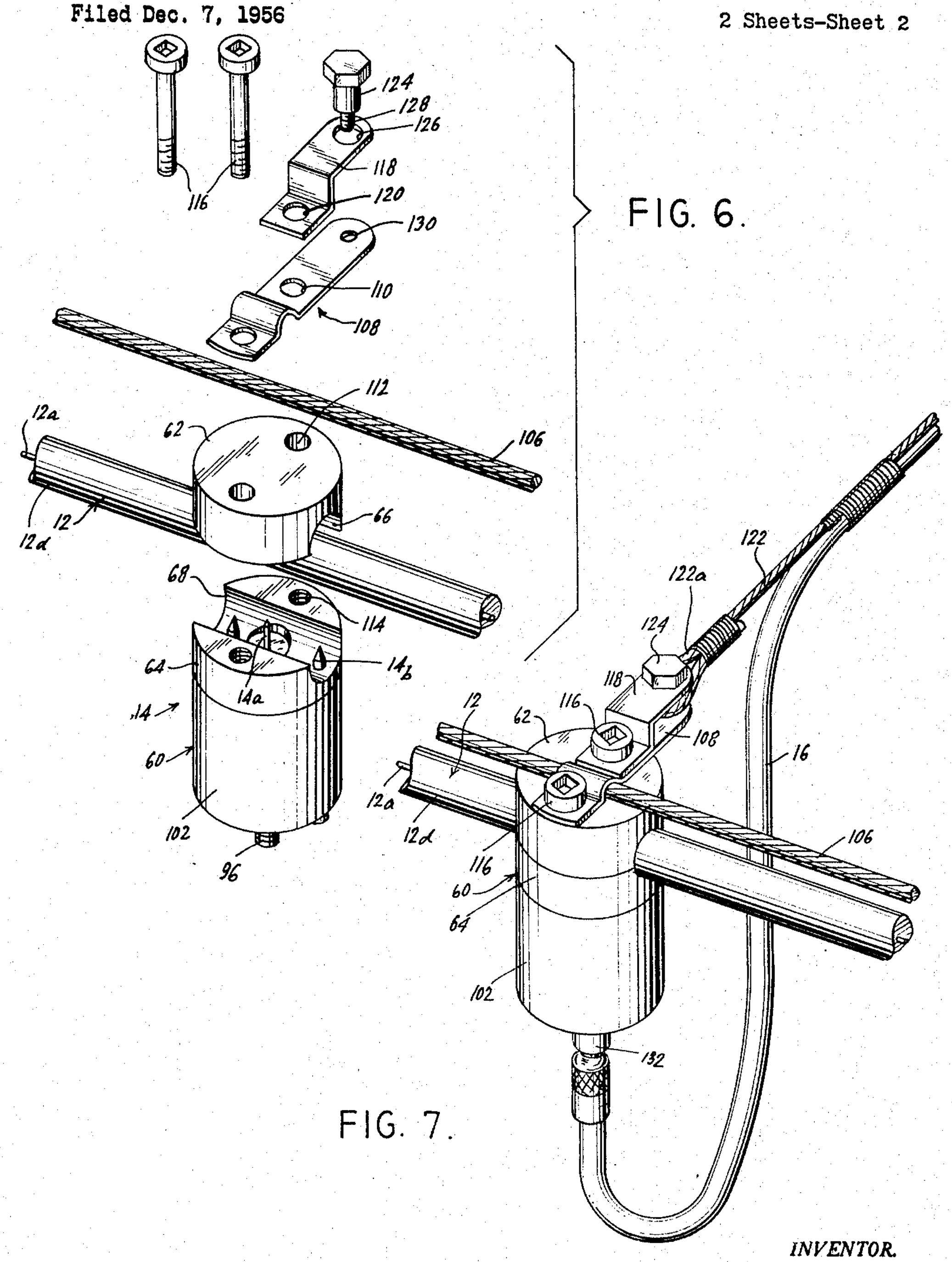
Fig. 6 is an exploded perspective view showing the component parts for attaching the improved tap-off of the present invention to a supporting cable; and, Fig. 7 is a perspective view similar to Fig. 6, but showing various component parts in assembled condition.

Reference will now be made to Figs. 6 and 7 for further details of the construction of the present solderless tap-off and impedance transformation system. The showing of Figs. 6 and 7 illustrates a typical installation on a pole or overhead main supporting cable 106. The main or messenger cable 106 is adapted to lie against the top face of the body 60, as seen in Fig. 7, and is clamped in position by a main or messenger cable clamp 108 which is provided with holes 110 which are aligned with holes 112 which extend through the top half section 62 of the clamp body 60. The holes 112 are further aligned with threaded holes 114 in the lower half section 64 of the clamp body 60. Clamp bolts 116 are provided which may be engaged through the aligned holes 110, 112 and 114 to fix the messenger cable clamp 108 to the top half section 62 of the clamp body and to simultaneously secure together the respective half sections of the clamp body 60.

A drop line clamp 118 is provided having an aperture 120 alignable with the adjacent aperture 110 for fixing the drop line messenger cable 122 which supports the subscriber's branch cable 16 to the main or messenger cable 106. This is achieved by the use of a drop line clamp bolt 124 which is engaged through an appropriate hole 126 in the clamp 118 and then through a cable loop 122a provided on the end of the drop line cable 122. The clamp bolt includes a threaded shank 128 which is received within a thread hole 130 in the main clamp 108. Coincident to bringing together the half sections 62, 64 of the clamp body 60, the respective contact pins 14a, 14b pierce the cable 12. With the aid of an appropriate connector 132 on the end of the subscriber's cable 16, the requisite connection to the bottom end of the tap-off 14 is achieved.

A typical installation sequence will now be described in detail in conjunction with Figs. 6 and 7:

Initially, the clamp bolts 116 are removed and the bottom and top halves of the clamp body 60 of the tap-off unit 14 are positioned on the main cable 12. The two clamp bolts are assembled through the messenger cable clamp 108 and through the drop line clamp 118. The messenger cable clamp is then placed over the messenger cable 106 and the clamp bolts inserted into the previously aligned top and bottom half sections 62, 64 of the tap-off unit. The clamp bolts 116 are tightened up gradually, making sure that the top half 62 of the clamp body 60 comes down squarely on the bottom half 64 of the clamp body. Each clamp bolt 116 should only be tightened one turn at a time, alternating from one bolt to the other until the bolts are tightened. This assures perfect penetration of the pins 14a, 14b into the cable and avoids unnecessary lateral stress. The drop line clamp bolt 124 is removed and a loop 122a is formed on the end of the drop line cable. The loop 122a is placed in position so that the bolt 124 may be engaged therethrough and the threaded shank 128 tapped into the hole 130. The drop line messenger cable 122 is then lashed to the subscriber's line 116 leaving a loop as illustrated to allow for drain off of water accumulations or the like, and to avoid moisture being introduced into the housing 102 of the solderless tap-off. Finally, the connection 132 is made to the coaxial output of the tap-off 14 as previously described.

Although the present invention has been described specifically for making branch connections to a cable carrying television signals, it will be appreciated that the illustrative coupling systems find broader application. Further, although the branch connections have been made with coaxial cables, it is equally within the contemplate of the invention to use standard 300 ohm cables for tapping-off signals from the main line. The use of the ferrite core transformer in the illustrative circuit of Fig. 2 is particularly significant in that the same reduces the straight capacitance to a minimum and allows for the design of a broad bandwidth circuit capable of handling a wide range of signals. If a conventional transformer were employed with a corresponding high capacitance between its turns, it would be difficult to design a low Q circuit suitable to operate at comparatively high frequencies and over a broad range.

A latitude of modification, substitution and changes intended in the foregoing disclosure and in some instances some features of the invention will be used without a corresponding use of other features. Accordingly, it is appropriate that the appended claims be construed broadly and in a manner consistent with the spirit and scope of the disclosure herein.

What I claim is:

1. In a television distribution system including a main coaxial line for distributing television signals in a prescribed band of frequencies and a branch coaxial line for connection to a subscriber's set, a tap-off connecting said branch coaxial line to said main coaxial line comprising respective electrical taps connected to the inner and outer conductors of said main coaxial cable, and impedance transformation means connected between said electrical taps and the inner and outer conductors of said branch coaxial cable, said impedance transformation means being so constructed and arranged as to provide a shunt resistive load across said main coaxial cable of a magnitude greater than ten times the characteristic impedance of said main coaxial cable, said impedance transformation means including a resonant circuit and a ferrite core transformer and having a broad response over a prescribed range of frequencies.

2. In a television distribution system including a main coaxial line for distributing television signals in the V.H.F. bands of 54 to 88 megacycles and 174 to 216 megacycles and a branch coaxial line for connection to a subscriber's set, a tap-off connecting said branch coaxial line to said main coaxial line including respective taps connected to the inner and outer conductors of said main coaxial line, and impedance transformation means connected between said taps and said branch coaxial line and shunting said main coaxial line with a load which is resistive over said V.H.F. bands, said impedance transformation means being arranged to convert the characteristic impedance of said branch coaxial line to a value in excess of ten times the characteristic impedance of said main coaxial line and including a delay line having three sections and a series-connected resistance, one of said sections providing the impedance transformation over the upper V.H.F. band and introducing a delay of ninety electrical degrees at the mid-frequency of said upper V.H.F. band, said three sections providing the impedance transformation over the lower V.H.F. band and introducing a delay of ninety electrical degrees at the mid-frequency of said lower V.H.F. band.

3. In a television distribution system including a main coaxial line for distributing television signals in the V.H.F. bands of 54 to 88 megacycles and 174 to 216 megacycles and a branch coaxial line for connection to a subscriber's set, a tap-off connecting said branch coaxial line to said main coaxial line including respective taps connected to the inner and outer conductors of said main coaxial line, and impedance transformation means connected between said taps and said branch coaxial line and shunting said main coaxial line with a load which is resistive over said V.H.F. bands, said impedance transformation means including a transformer having a ferrite core and arranged to convert the characteristic impedance of said branch coaxial line to a value in excess of ten times the characteristic impedance of said main coaxial line, and an inductance-capacitance network having multiple resonant frequencies, said network being resonant at the mid-frequency of each of said V.H.F. bands.

4. In a television distribution system including a main coaxial line for distributing television signals in a prescribed band of frequencies and a branch coaxial line for connection to a subscriber's set, a tap-off connecting said branch coaxial line to said main coaxial line including respective taps connected to the inner and outer conductors of said main coaxial line, and impedance transformation means connected between said taps and said branch coaxial line and shunting said main coaxial line with a load which is resistive over said band, said impedance transformation means including a transformer having a ferrite core and arranged to convert the characteristic impedance of said branch coaxial line to a value in excess of ten times the characteristic impedance of said main coaxial line, and an inductance-capacitance network resonant at the mid-frequency of said band.

References Cited in the file of this patent

UNITED STATES PATENTS

| | | |
|---|---|---|
| 2,203,746 | Roosenstein | June 11, 1940 |
| 2,706,282 | Dudra | Apr. 12, 1955 |
| 2,710,315 | Tongue | June 7, 1955 |